US007553119B2

(12) United States Patent
Good et al.

(10) Patent No.: US 7,553,119 B2
(45) Date of Patent: Jun. 30, 2009

(54) MAIL TRAY UNLOADER WITH SHUTTLE TRANSFER THROUGH SYSTEM COMPRISING TILTING

(75) Inventors: Matthew Gene Good, Marriotsville, MD (US); Robert Lee Schlender, Baltimore, MD (US); Thomas Anthony Hillerich, Louisville, KY (US); Jacob L. Timm, Columbia, MD (US); Charles Michael Miller, Seven Valleys, PA (US); Mark Thomas Neebe, Catonsville, MD (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 48 days.

(21) Appl. No.: 11/678,344

(22) Filed: Feb. 23, 2007

(65) Prior Publication Data

US 2007/0201968 A1 Aug. 30, 2007

Related U.S. Application Data

(60) Provisional application No. 60/776,227, filed on Feb. 24, 2006.

(51) Int. Cl.
*B65G 1/00* (2006.01)
*B65B 69/00* (2006.01)
*B65G 65/04* (2006.01)
*B65H 5/00* (2006.01)

(52) U.S. Cl. ...................... 414/331.08; 271/2; 414/404; 414/405

(58) Field of Classification Search ..................... 271/2, 271/149; 414/331.01–331.05, 331.08–331.1, 414/331.14–331.18, 332, 403, 404, 405, 414/408, 409, 419, 425, 758, 762, 763, 783
See application file for complete search history.

(56) References Cited

U.S. PATENT DOCUMENTS

| | | | | |
|---|---|---|---|---|
| 3,880,298 | A | | 4/1975 | Habegger et al. |
| 3,964,624 | A | * | 6/1976 | Werder ....................... 414/421 |
| 4,446,962 | A | | 5/1984 | Burkhardt |
| 4,509,635 | A | | 4/1985 | Emsley et al. |
| 4,699,277 | A | | 10/1987 | Baxter |
| 4,725,182 | A | | 2/1988 | Sakamoto et al. |
| 4,730,730 | A | | 3/1988 | Clarkson |
| 4,757,985 | A | | 7/1988 | Hamant et al. |
| 4,863,037 | A | | 9/1989 | Stevens et al. |
| 4,895,242 | A | | 1/1990 | Michel |
| 5,044,877 | A | | 9/1991 | Constant et al. |
| 5,054,992 | A | | 10/1991 | Hognestad et al. |
| 5,104,109 | A | | 4/1992 | Kubo |
| 5,106,254 | A | | 4/1992 | Tolasch et al. |
| 5,119,954 | A | | 6/1992 | Svyatsky et al. |
| 5,183,378 | A | | 2/1993 | Asano et al. |
| 5,239,182 | A | | 8/1993 | Tateyama et al. |

(Continued)

*Primary Examiner*—Gregory W Adams
(74) *Attorney, Agent, or Firm*—Rothwell, Figg, Ernst & Manbeck, P.C.

(57) ABSTRACT

An automated flats handling system is provided that includes mail shuttles, a tray unloading section, a quality control area, a shuttle tilter, a shuttle return section and a stacker/loader. The tray unloading section has a conveyor and unloads mail from a standard tray into one of the shuttles. The quality control area also has a conveyor and facilitates grooming the mail in the shuttle. The shuttle tilter tilts each shuttle prior to unloading the mail from the shuttle. The shuttle return section also has a conveyor and returns the shuttles to the tray unloading section. The stacker/loader cooperates with the shuttle tilter and unloads the mail from the shuttles, creates a mail stack from the unloaded mail, and loads a portion of the mail stack into an automation compatible tray.

12 Claims, 13 Drawing Sheets

U.S. PATENT DOCUMENTS

| | | | | |
|---|---|---|---|---|
| 5,244,199 | A | 9/1993 | Wood | |
| 5,266,812 | A | 11/1993 | Mokuo | |
| 5,588,520 | A | 12/1996 | Affaticati et al. | |
| 5,772,383 | A * | 6/1998 | Kalika et al. | 414/403 |
| 5,947,468 | A * | 9/1999 | McKee et al. | 271/210 |
| 6,201,203 | B1 | 3/2001 | Tilles | |
| 6,217,274 | B1 * | 4/2001 | Svyatsky et al. | 414/405 |
| 6,241,099 | B1 | 6/2001 | Hendrickson et al. | |
| 6,398,008 | B1 * | 6/2002 | Suga | 198/404 |
| 6,585,101 | B2 | 7/2003 | Edwards et al. | |
| 6,629,691 | B2 * | 10/2003 | Niiyama et al. | 271/2 |
| 6,889,814 | B2 | 5/2005 | Cerutti et al. | |
| 7,195,236 | B2 | 3/2007 | Hillerich, Jr. et al. | |
| 2002/0125177 | A1 | 9/2002 | Burns et al. | |
| 2002/0146308 | A1 * | 10/2002 | Svyatsky et al. | 414/404 |
| 2004/0193554 | A1 * | 9/2004 | Hillerich et al. | 705/401 |
| 2005/0077217 | A1 | 4/2005 | Hillerich, Jr. et al. | |
| 2006/0272292 | A1 | 12/2006 | Caporali et al. | |
| 2007/0203612 | A1 | 8/2007 | Mileaf | |
| 2007/0207027 | A1 | 9/2007 | Neebe et al. | |

* cited by examiner

MAIL TRAY UNLOADER WITH SHUTTLE TRANSFER THROUGH SYSTEM COMPRISING TILTING

CROSS REFERENCE TO RELATED APPLICATIONS

This application claims the benefit of U.S. provisional application Ser. No. 60/776,227, filed on Feb. 24, 2006, the contents of which are incorporated herein by reference.

BACKGROUND OF THE INVENTION

The United States Postal Service (USPS) Automated Flats Sorting Machine 100 (AFSM 100) has three high-speed feeders and can handle 7200 pieces per hour. This high-speed automation has increased the demand of mail on system feeders. Operational experience has shown that this demand is challenging for operators to meet. Operators are required to place approximately 10" of mail onto a feeder per minute. Mail must be placed in proper orientation (binding down with the mailing label facing to the right) and 'groomed' to ensure proper system operation. In order to reduce the requirements on feeder operators, USPS pre-processes mail fed into this machinery. In the pre-processing step mail is converted from its current container to an Automation Compatible Trays, or ACTs. The ACTs allow the mail to be fed automatically into the feeders.

Currently, mail is manually pre-processed into ACTs using a mail preparation station. Mail is conveyed in bundle form or standard USPS tray to an operator who places the mail into an ACT. Once the mail is placed into the ACT, the ACT is transported on conveyors to the automated feeders. In order for the mail preparation station to supply the automated feeders, multiple mail preparation stations are required, which require labor and floor space. These preparation operations are manually intensive and typical represent more than 50% of the cost to process the mail. This offsets a portion of the savings created by the processing/sequencing operations. A method of automating the preprocessing of mail into ACTs from its current form would be highly desirable and reduce the amount of labor required.

BRIEF SUMMARY

Embodiments of the present invention provide an automated flats handling system that includes mail shuttles, a tray unloading section, a quality control area, a shuttle tilter, a shuttle return section and a stacker/loader. The tray unloading section has a conveyor and unloads mail from a standard tray into one of the shuttles. The quality control area also has a conveyor and facilitates grooming the mail in the shuttle. The shuttle tilter tilts each shuttle prior to unloading the mail from the shuttle. The shuttle return section also has a conveyor and returns the shuttles to the tray unloading section. The stacker/loader cooperates with the shuttle tilter and unloads the mail from the shuttles, creates a mail stack from the unloaded mail, and loads a portion of the mail stack into an automation compatible tray.

DETAILED DESCRIPTION

Embodiments of the present invention advantageously provide a system and process for automatically preparing mail from USPS trays into ACTs while creating an efficient load in each ACT by staging the incoming mail and then separating it into ACT loads prior to transferring the mail into the ACTs. The present invention, known as the Automated Flats Divider, or AFD, is designed to transfer mail from standard USPS trays (or bundled mail) to ACTs. The AFD advantageously allows mail to be pre-processed into ACTs using fewer operators. Additionally the AFD does not require the operator to lift mail out of the USPS trays in order to place the mail into ACTs.

Embodiments of the present invention enable efficient, automatic loading of ACTs from a variety of sources including USPS trays and reduces the labor content of prepping the mail for processing. The system has a small footprint and high throughput. The high throughput is accomplished by buffering material between stages to prevent starvation, whereas it has a small footprint due to the compact stacking and dividing operation. An additional benefit to the AFD is that the operator no longer has to physically lift the mail out of a USPS tray providing a more ergonomic process.

Figure 1:
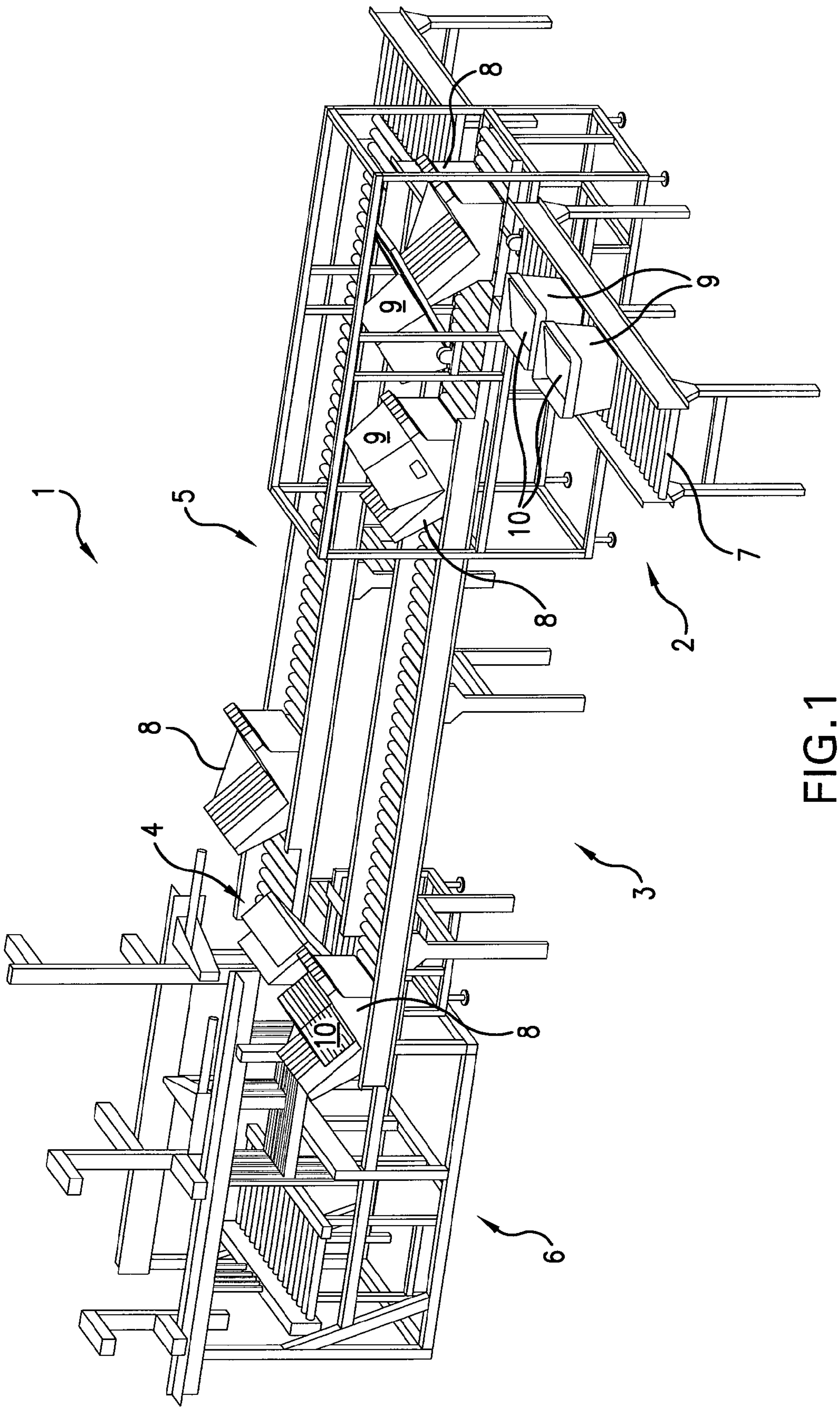
FIG. 1 depicts a perspective view of an automated flats divider, in accordance with an embodiment of the present invention.

FIG. 1 depicts a perspective view of an automated flats divider, in accordance with an embodiment of the present invention. Generally, AFD 1 creates a stack of mail in the preferable orientation (e.g., binding down, label facing to the right) along a flat surface (e.g., shelf 66), proportions the stack of mail into ACT-sized portions and loads each portion into an ACT. To build and divide the stack of mail into ACT-sized portions, in the preferred embodiment, AFD 1 includes a tray unloading section 2, a quality control area 3, a shuttle tilter 4, a shuttle return section 5 and a stacker/loader 6.

Mail 10 is brought into AFD 1 directly from the docks, or from other mail sorting machinery within the processing center, in USPS trays 9, which are introduced into AFD 1 via conveyor 7. The USPS trays 9 are placed on conveyor 7 in an upright orientation, in which the opening is on top, as depicted in FIG. 1. Generally, tray unloading section 2 automatically unloads mail 10, from USPS trays 9 into shuttles 8, which are used to transport mail 10 to the next section of AFD 1. Various conveyors, such as, for example, powered rollers, conveyor belts, etc., are used to transport the shuttles within tray unloading section 2, quality control area 3 and shuttle return section 5.

Figure 2:
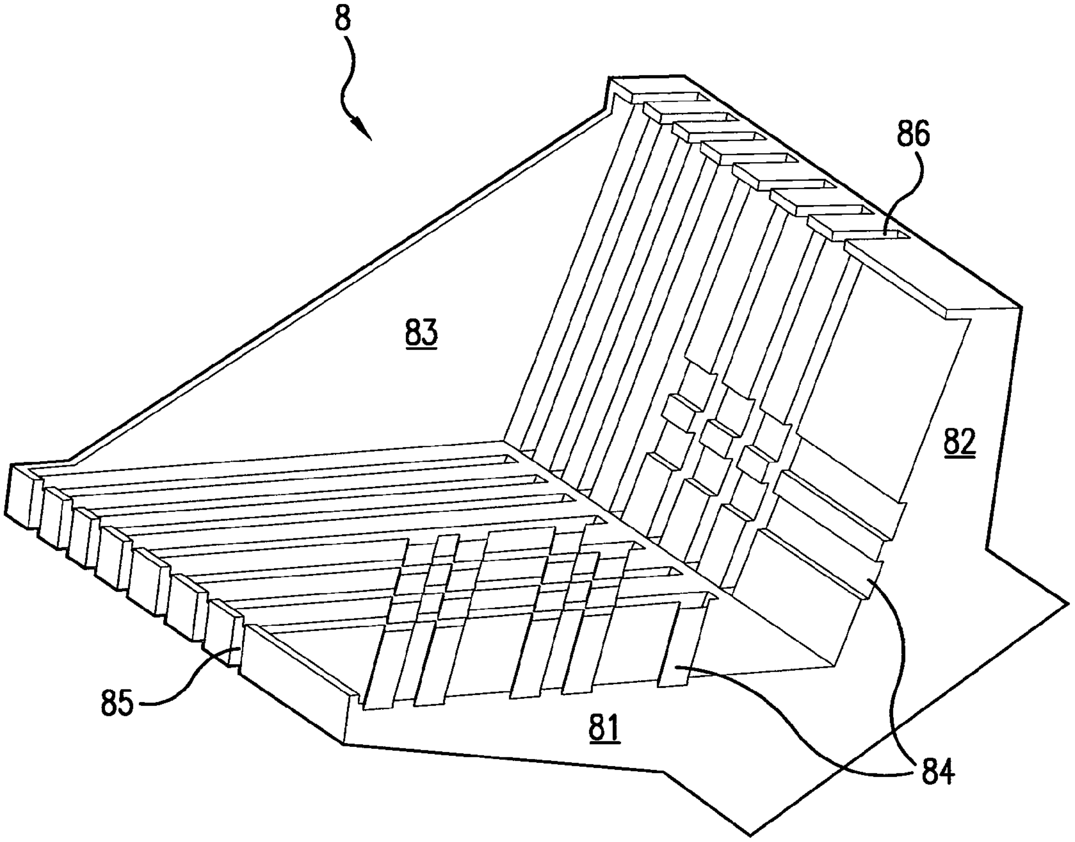
FIG. 2 depicts a perspective view of a shuttle for an automated flats divider, in accordance with an embodiment of the present invention.

FIG. 2 depicts a perspective view of a shuttle for an automated flats divider, in accordance with an embodiment of the present invention. Shuttle 8 has walls 81, 82, 83 that facilitate inspection and 'grooming' of mail 10 to ensure proper position and orientation within shuttle 8. In one embodiment, finger grooves 84, in walls 81, 82, provide easy access to the undersides of mail 10 to aid in the inspection and grooming processes. Slots 85 and grooves 86 are provided in walls 81, 82, respectively, to facilitate unloading of shuttle 8 within stacker/loader 6. Shuttle 8 can be manufactured, for example, from disposable, recyclable or reusable material, and is advantageously designed to allow an operator easy access to five sides of the stack of mail 10, i.e., front, left, right, top and bottom.

Figure 3:
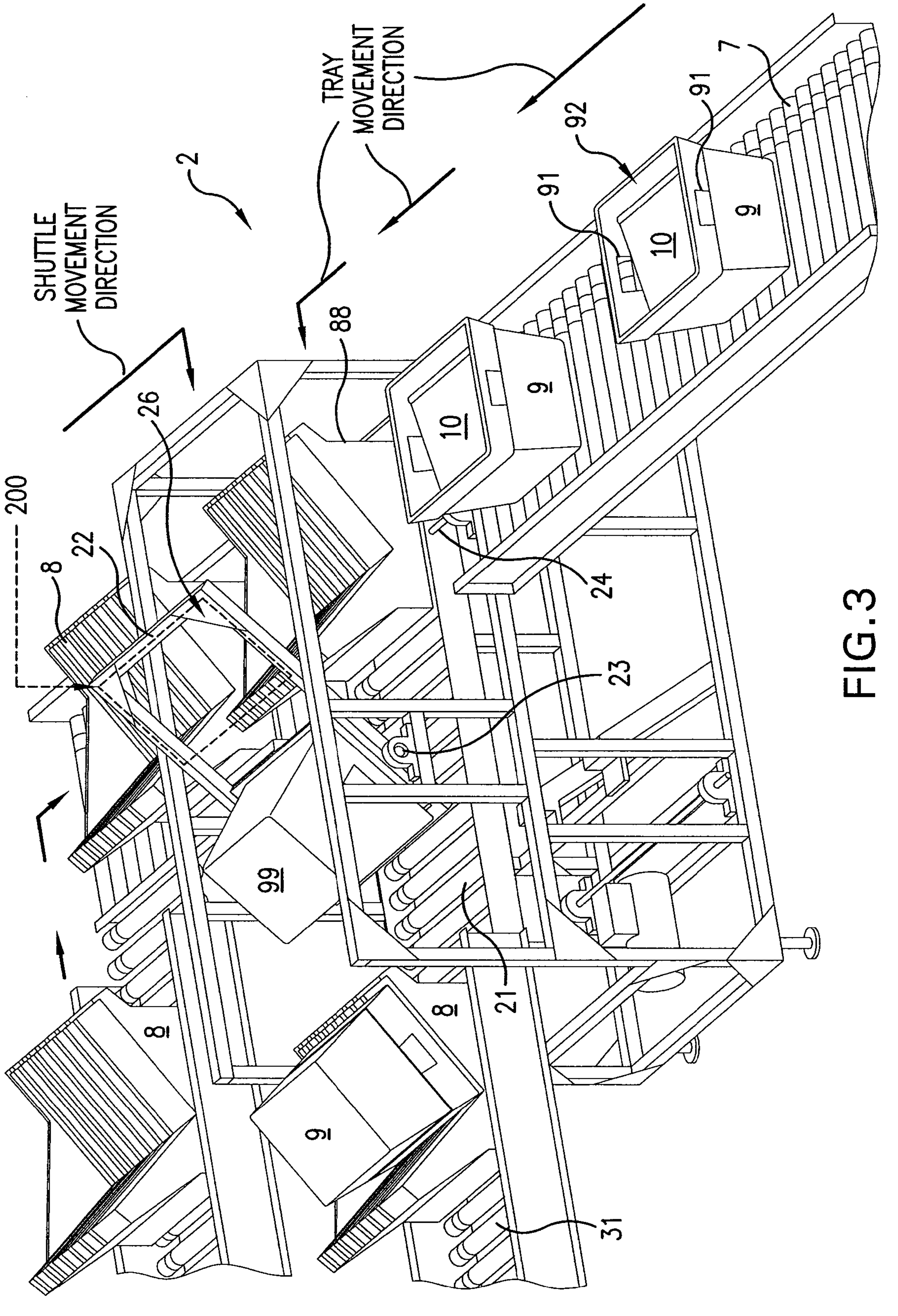
FIG. 3 depicts a perspective view of a tray unloading section for an automated flats divider, in accordance with an embodiment of the present invention.

FIG. 3 depicts a perspective view of a tray unloading section for an automated flats divider, in accordance with an embodiment of the present invention. USPS trays 9 are introduced onto conveyor 7, and then individually positioned onto conveyor 21 directly underneath rotatable frame 22. Each individual USPS tray 99 is oriented beneath frame 22 and secured to frame 22 by handles 91, while a cover plate (not shown) is slid from the top portion 26 of frame 22 down over opening 92, thereby enclosing the mail 10. USPS tray 99 is then rotated about pivot 23, from an upright orientation to a downward-facing, inverted orientation, as shown in FIG. 3. The inverted orientation preferably aligns the plane defined by opening 92 with the plane defined by wall 82 of shuttle 8. In a preferred embodiment, shuttle wall 82 forms an angle of about 45° with respect to the horizontal, and USPS tray 9 is rotated about 135° in a clockwise direction, as shown in FIG. 3.

While USPS tray 99 is being inverted, or soon thereafter, shuttle 88 is rolled onto conveyor 21, directly behind USPS tray 99 and proximal to frame 22. To place shuttle 88 underneath inverted USPS tray 99, conveyor 21 is depressed, i.e., rotated in a counter-clockwise direction about pivot 24, allowing shuttle 88 to advance under USPS tray 99. Conveyor 21 then rotates to its upright position, as shown in FIG. 3. Shuttle 88 may then be positioned directly below USPS tray 99 by the use of stops. The cover 200 is slid back to expose opening 92, and handles 91 are released. Shuttle 88 then advances to the next conveyor in AFD 1, i.e., conveyor 31, and USPS tray 99 is removed from shuttle 88 using a vacuum pickup (not shown) that attaches to the bottom of USPS tray 99. At this point, mail 10 should be preferably oriented in shuttle 8 (binding down, label facing to the right).

In a preferred embodiment, this process is controlled by a microprocessor, microcontroller, etc., using various actuators and sensors, such as, for example, motors, pistons, optical detectors, inductive sensors, etc., to secure USPS tray 9 to frame 22, slide the cover plate over opening 92, rotate frame 22, energize and articulate conveyor 21, 31, etc. In other embodiments, an operator may manually perform one or more steps of this process, such as, for example, securing USPS tray 9 to frame 22, sliding the cover over opening 92, rotating frame 22. etc.

Figure 4:
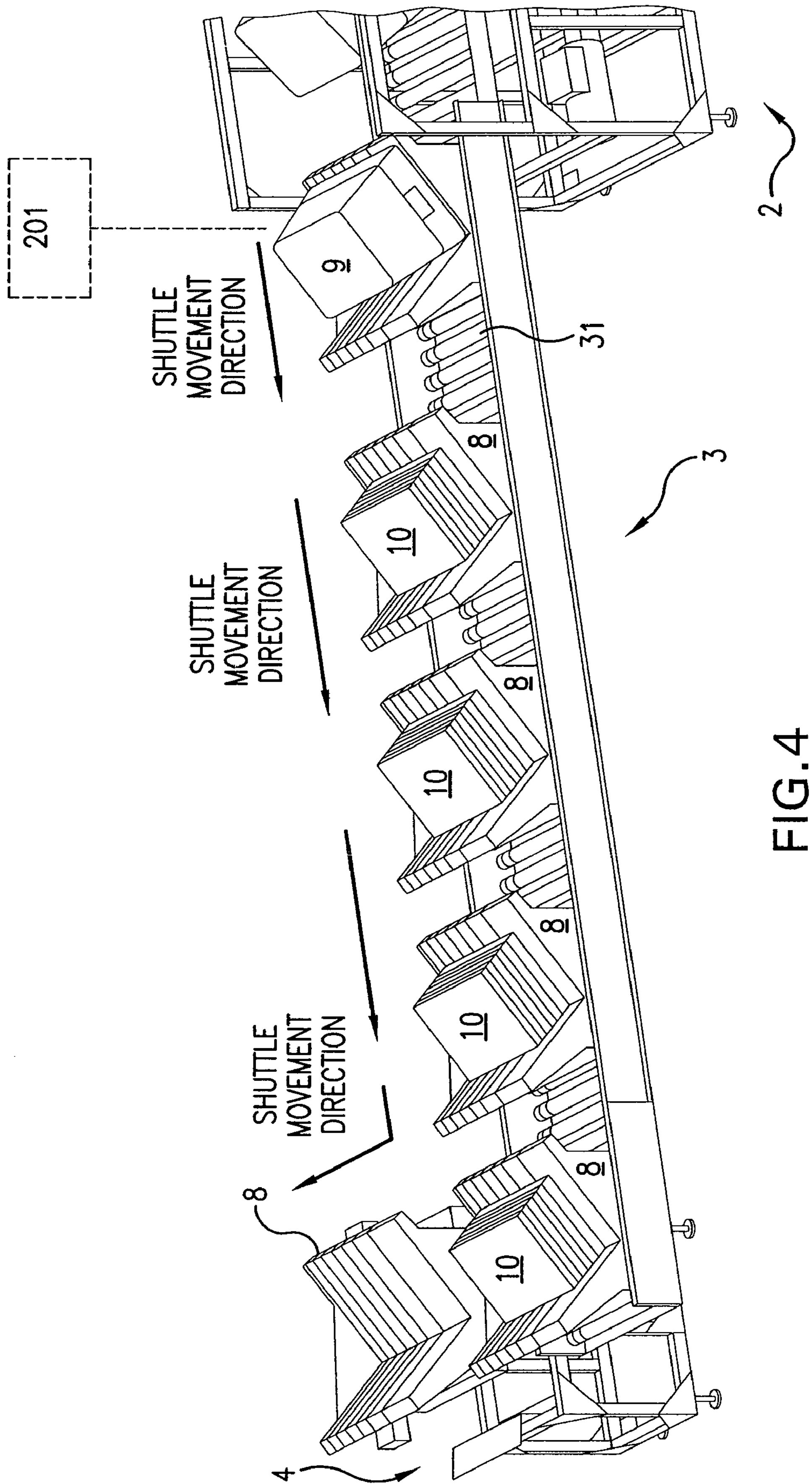
FIG. 4 depicts a perspective view of a quality control area for an automated flats divider, in accordance with an embodiment of the present invention.

FIG. 4 depicts a perspective view of a quality control area for an automated flats divider, in accordance with an embodiment of the present invention. After mail 10 is unloaded from USPS trays 9 into shuttles 8 in tray unloading section 2, each shuttle 8 is transported along conveyor 31 through quality control area 3. Quality control area 3 is, preferably, the only location at which an operator needs to process mail 10. Here, the operator 'grooms' mail 10, if necessary, to ensure that mail 10 is preferably oriented, as described above. After mail 10 has been groomed (if necessary), each shuttle 8 advances along conveyor 31 to the shuttle tilter 4.

Figure 5:
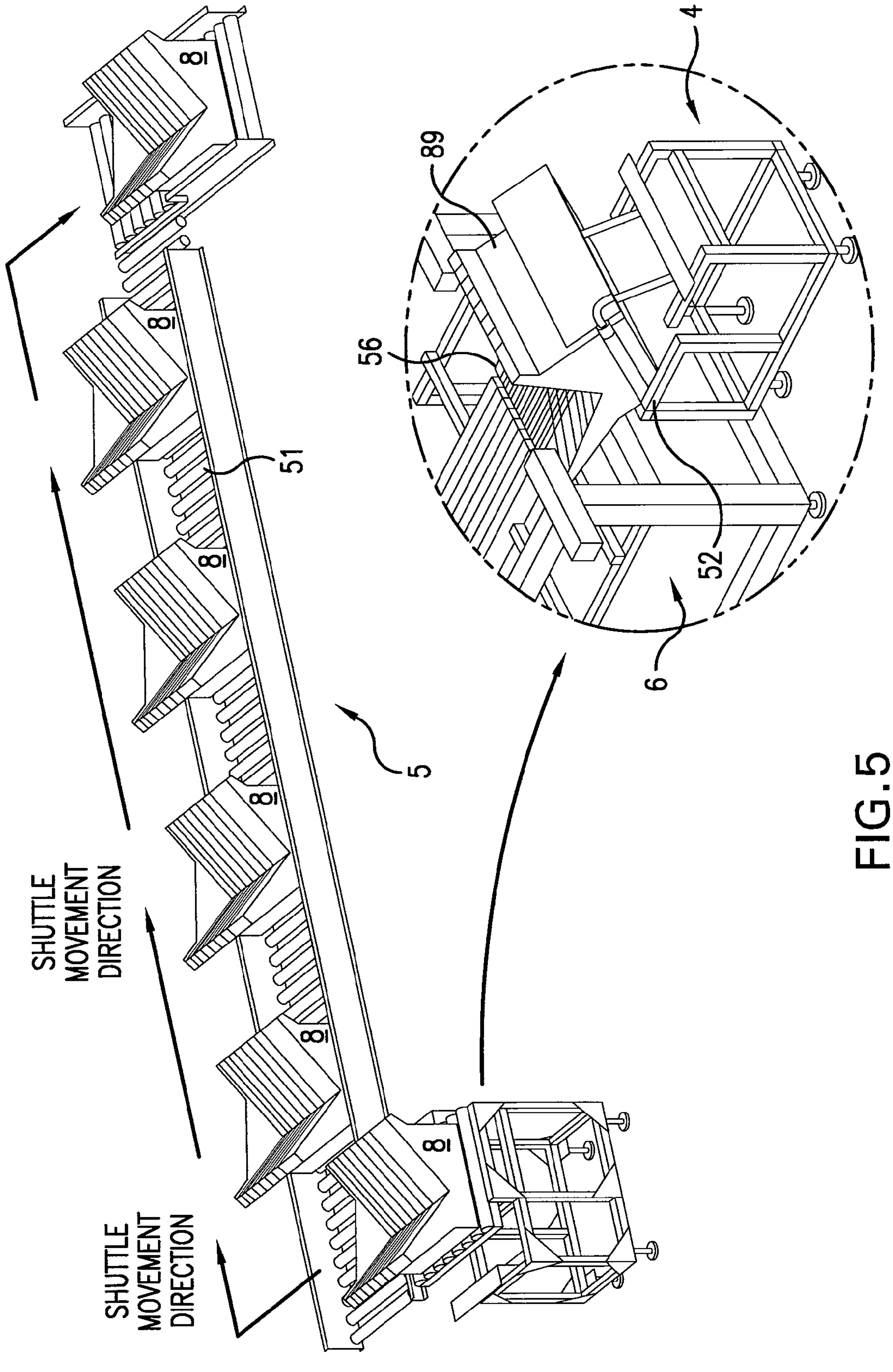
FIG. 5 depicts a perspective view of a shuttle tilter and a shuttle return section for an automated flats divider, in accordance with an embodiment of the present invention.

FIG. 5 depicts a perspective view of a shuttle tilter and a shuttle return section for an automated flats divider, in accordance with an embodiment of the present invention. After passing through quality control area 3, each shuttle 8 is transported along conveyor 31 and then securely fastened within shuttle tilter 4, which is rotated a predetermined angle counter clockwise, such as, for example, from about 30° to about 60°. As shuttle 89 is rotated about pivot 52, slots 85 in shuttle 89 mesh with slotted surface plate 56 of stacker/loader 6, as depicted in the insert (FIG. 5). Generally, stacker/loader 6 sweeps mail 10 out of shuttle 89. Once mail 10 is removed, shuttle 89 is rotated back to its original position and then transported, via conveyor 51, through shuttle return section 5 back to tray unloading section 2, where the process begins again.

Figure 6:
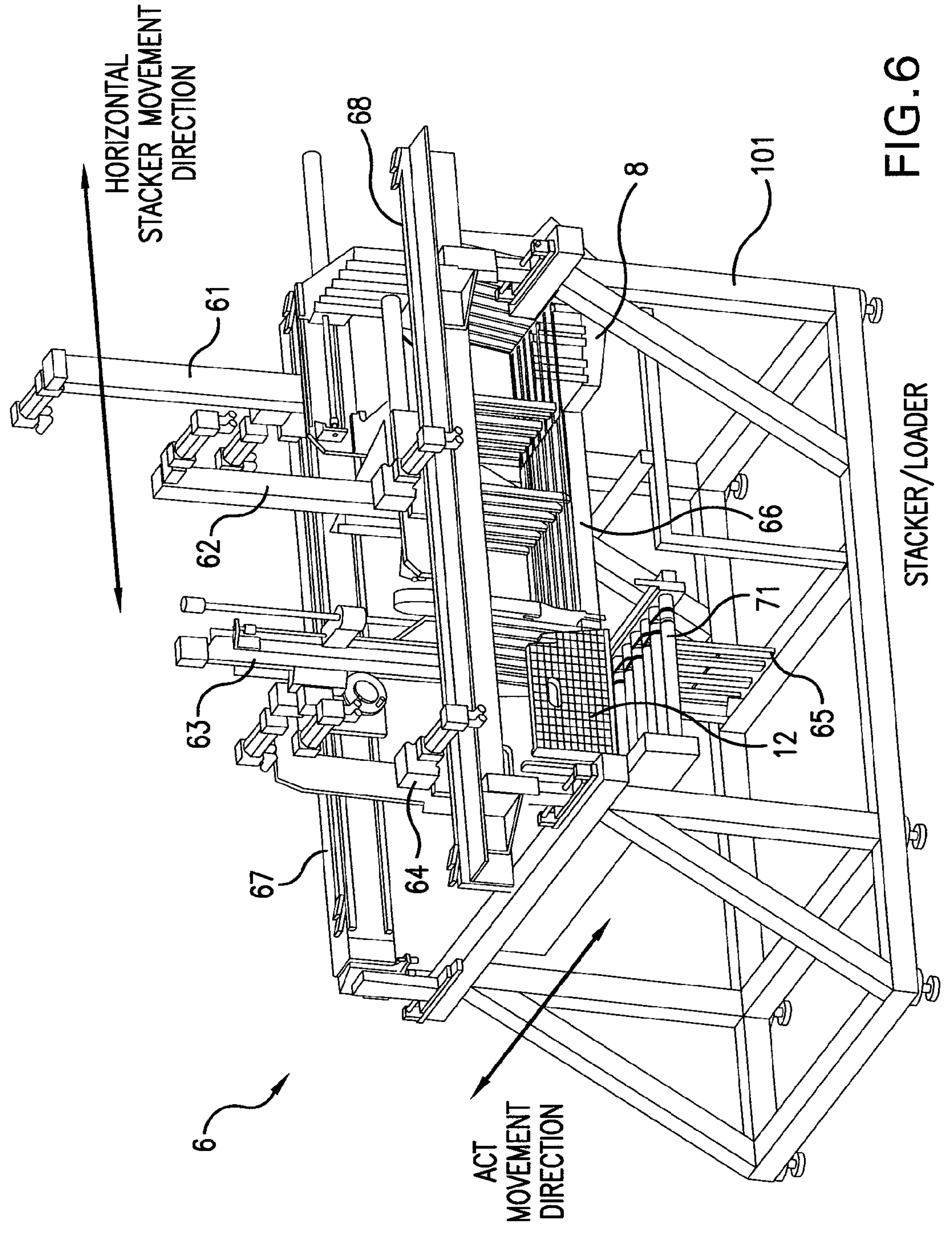
FIG. 6 depicts a perspective view of a stacker/loader for an automated flats divider, in accordance with an embodiment of the present invention.

FIG. 6 depicts a perspective view of a stacker/loader for an automated flats divider, in accordance with an embodiment of the present invention. Stacker/loader 6 includes a frame 101, two stackers 61, 62, to remove the mail from the shuttle 8 and create a stack of mail, an autopaddle 63, to remove and place the ACT door (not shown), as well as to push an ACT-sized portion of the mail stack into ACT 12, a backstop 64, to support the mail stack while the ACT-sized portion is pushed into ACT 12, a separator 65, to divide, or cut, the mail stack into the ACT-sized portions, and a shelf 66, connected to slotted surface plate 56, to support the mail as it is stacked and separated. Separator 65 rises from below shelf 66, through a gap between shelf 66 and ACT 12, to cut the mail stack. A conveyor 71 moves ACT 12 into, and out of, stacker 6.

Figure 7:
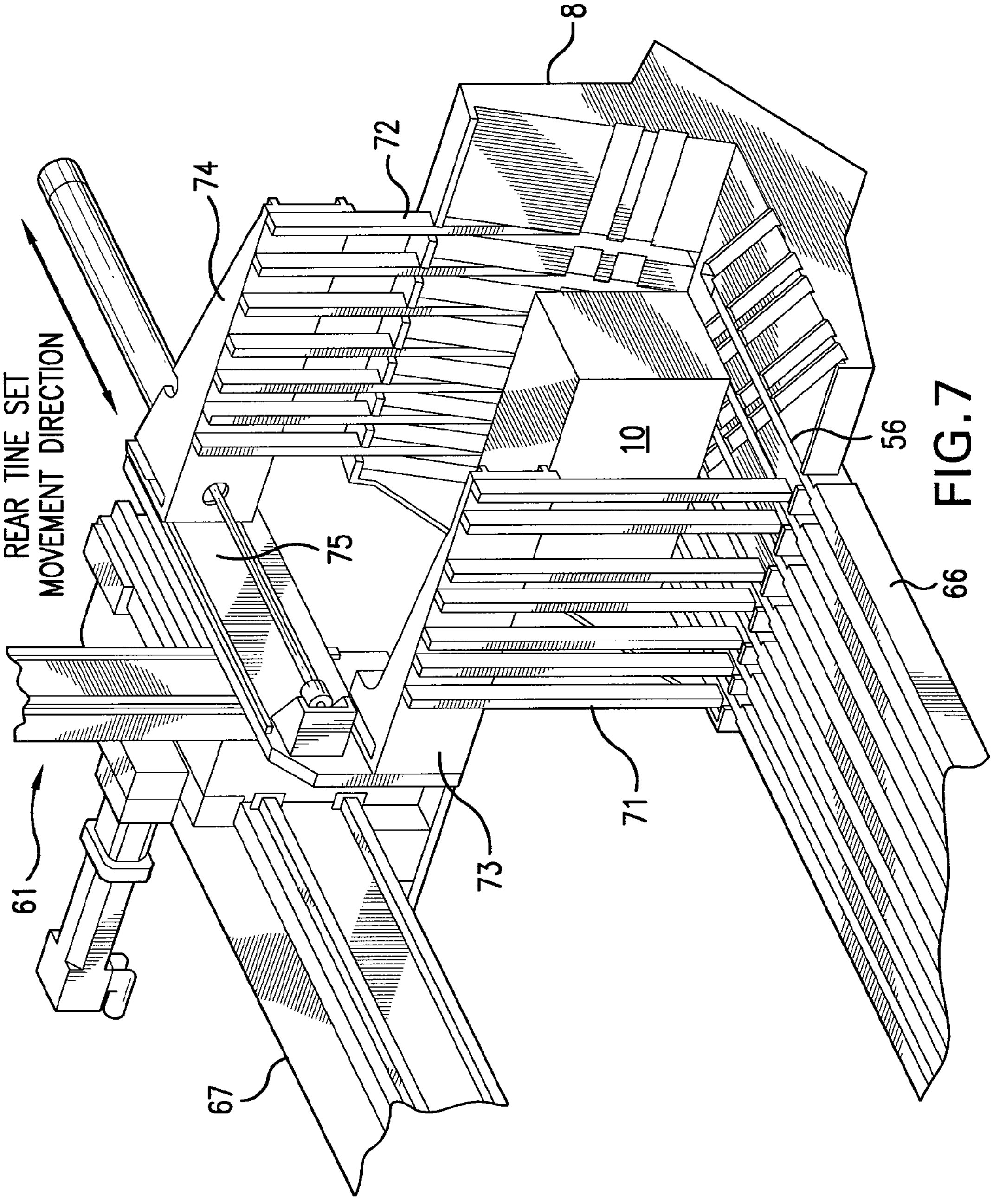
FIG. 7 depicts a perspective view of a stacker for an automated flats divider, in accordance with an embodiment of the present invention.

FIG. 7 depicts a perspective view of a stacker for an automated flats divider, in accordance with an embodiment of the present invention. Stacker 61 (depicted) has two sets of tines, front tines 71 and rear tines 72, and is mounted to, and moves along, rear support rail 67. In a preferred embodiment, front tines 71 are fixed to rear stacker 61, while rear tines 72 can move, generally, in the same direction as stacker 61. In one embodiment, rear tines 72 are mounted to rear support post 74, which is coupled to support plate 75, while front tines 71 are mounted to front support post 73, which is fixed to plate 75, to the left of, and below, rear support post 74.

Figure 8:
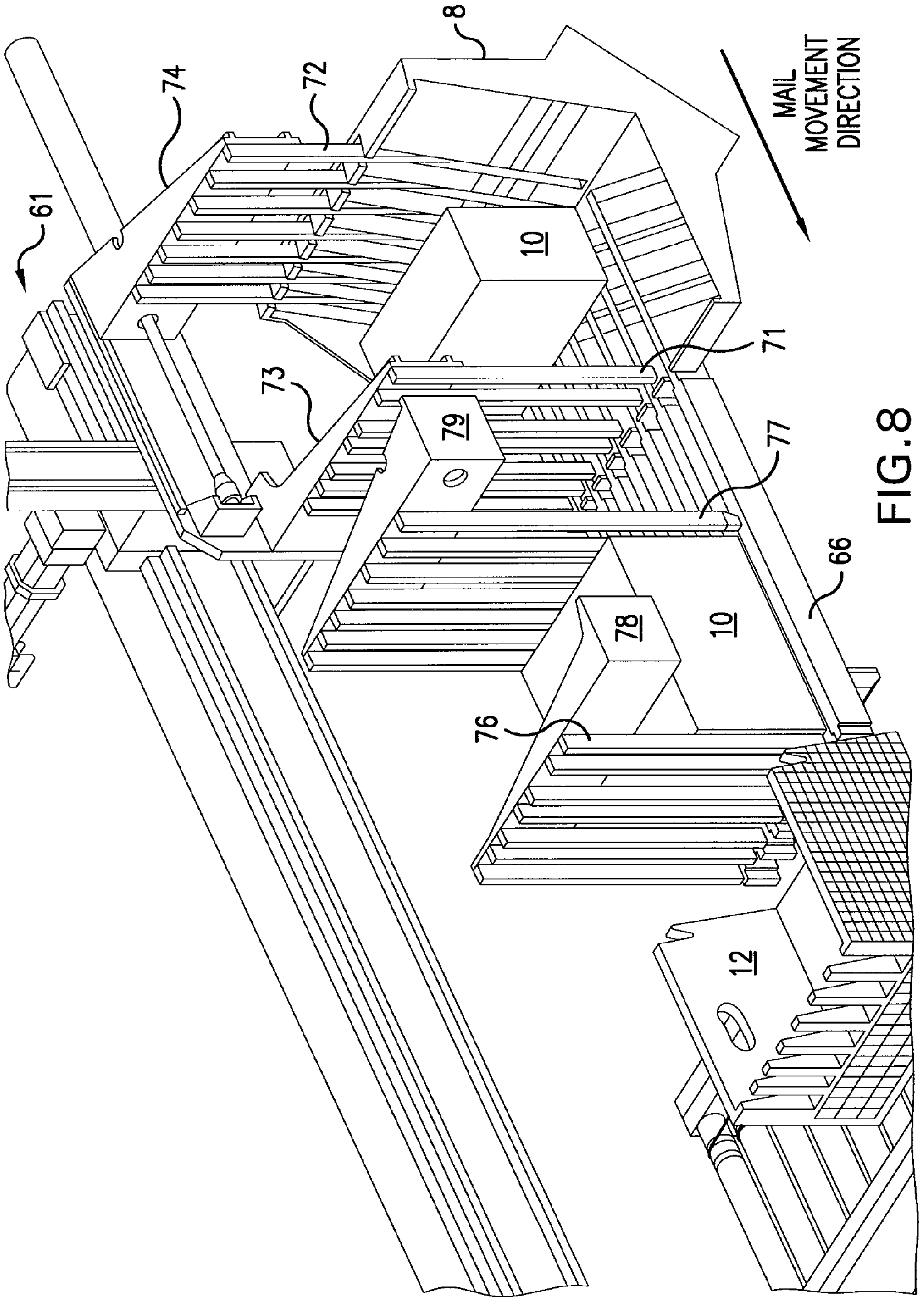
FIGS. 8, 9, 10 and 11 depict cut-away, perspective views of a stacker/loader for an automated flats divider, in accordance with an embodiment of the present invention.
Figure 9:
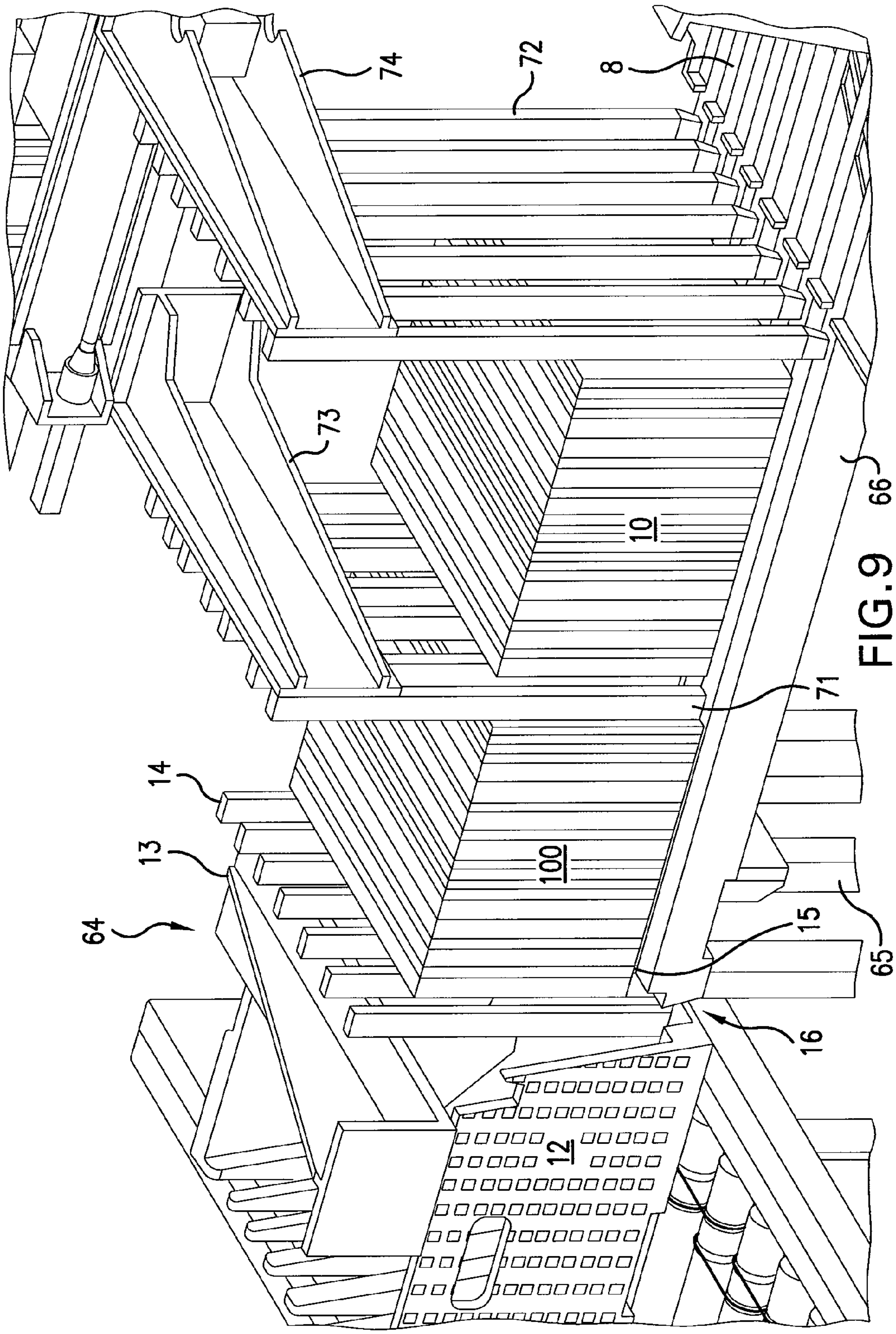
Figure 10:
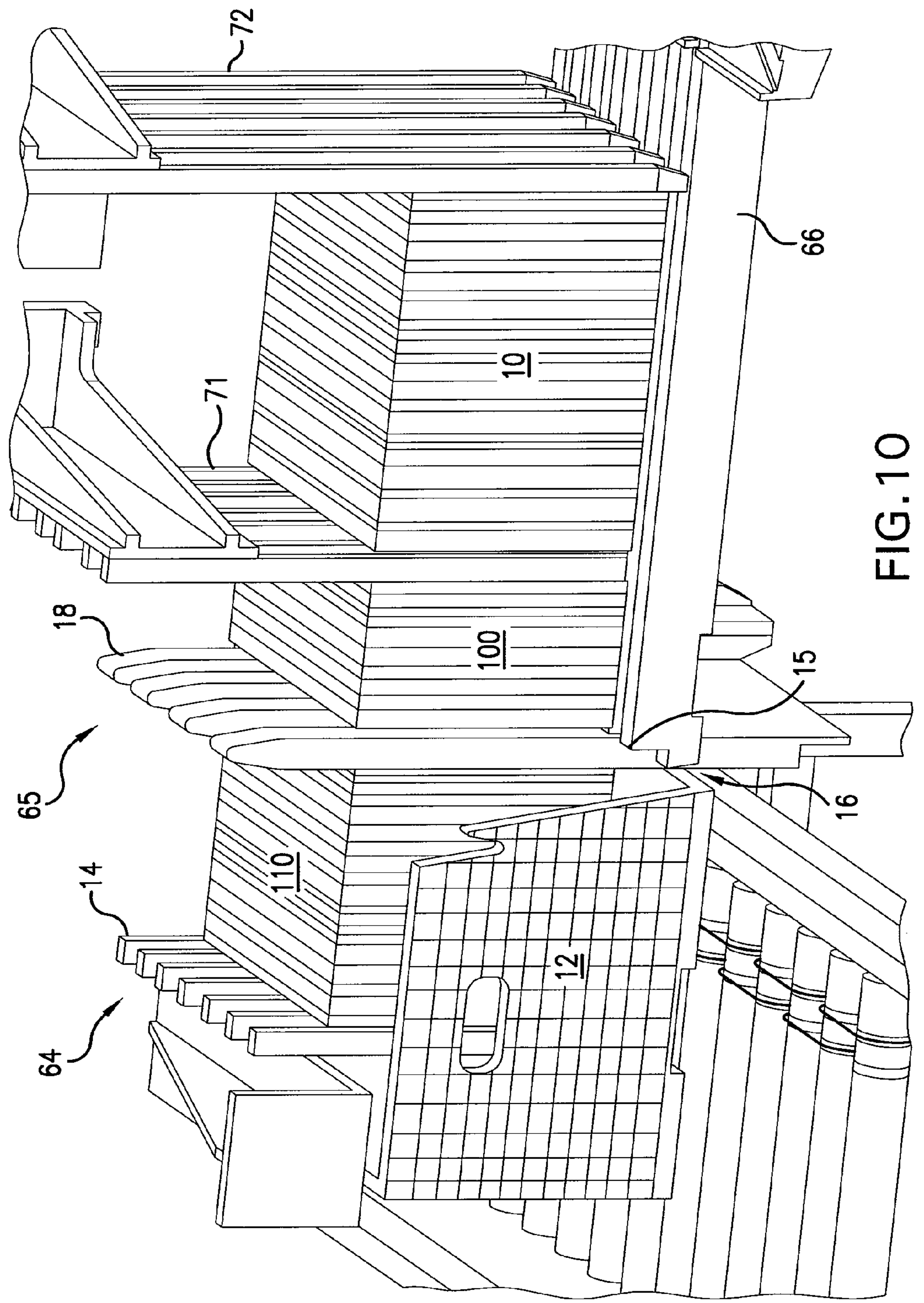
Figure 11:
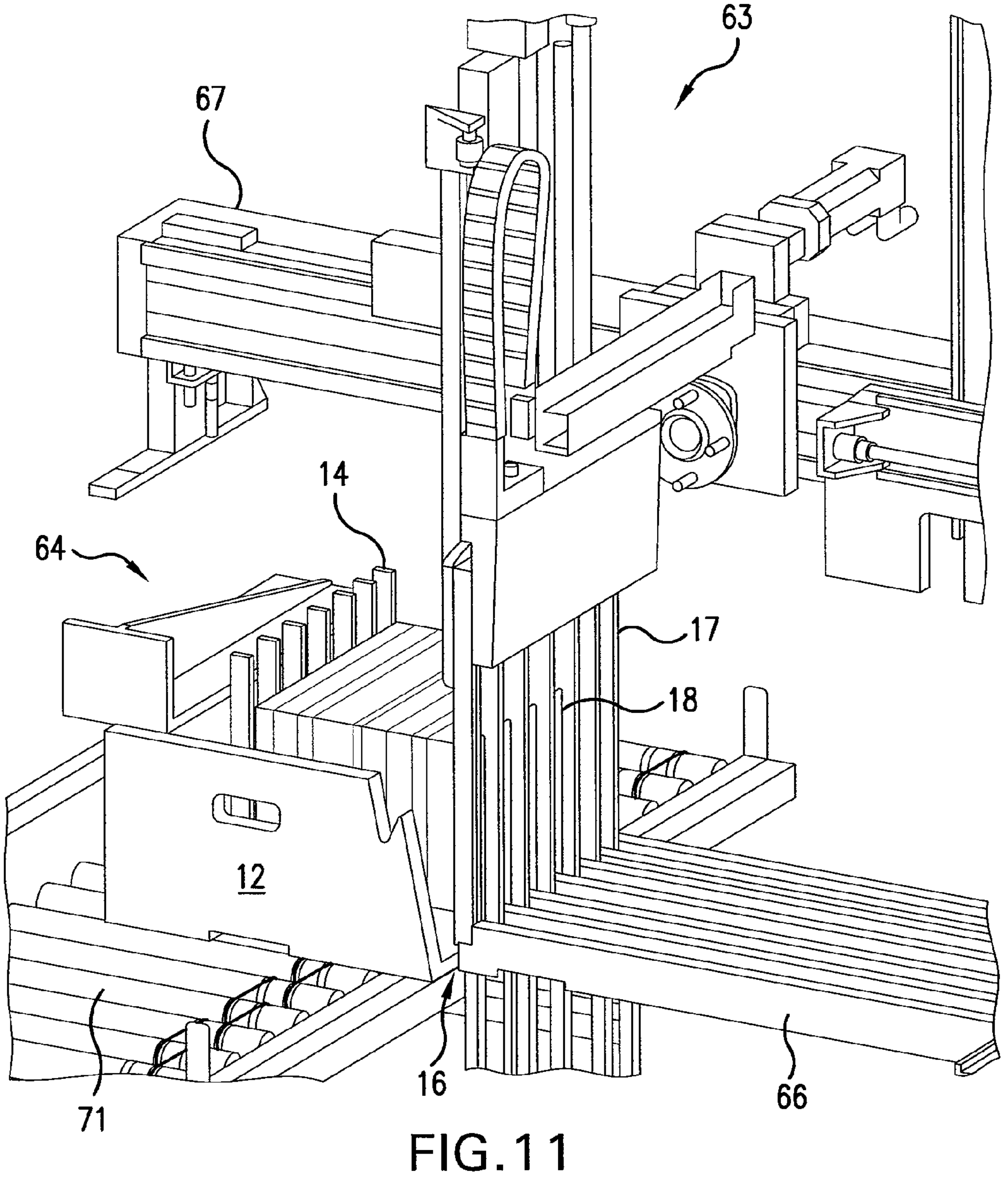

Similarly, stacker 62 (not shown for clarity) also has two sets of tines, front tines 76 and rear tines 77, and is mounted to, and moves along, front support rail 68. Front tines 76 are fixed to stacker 62, while rear tines 77 can move, generally, in the same direction as stacker 62. Rear tines 77 are mounted to rear support post 79, which is coupled to a support plate, while front tines 76 are mounted to front support post 78, which is fixed to the support plate, to the left of, and below, rear support post 79. Front and rear tines 76, 77, and front and rear support posts 78, 79, are depicted in FIG. 8.

FIGS. 8, 9, 10 and 11 depict cut-away, perspective views of a stacker/loader for an automated flats divider, in accordance with an embodiment of the present invention.

After shuttle 8 is tilted into position by shuttle tilter 4, as described above, stacker 61 is lowered towards shuttle 8, which places front tines 71 in front, and rear tines 72 behind, mail 10. As stacker 61 is lowered, rear tines 72 cooperatively engage slots 86 in shuttle 8. Rear support post 74 is then advanced along support plate 75 towards front support post 73, which causes rear tines 72 to push mail 10 towards front tines 71. When mail 10 contacts front tines 71, rear support post 74 stops advancing, which captures mail 10 between front and rear tines 71, 72. Stacker 61 is then advanced along rear support rail 67 towards the ACT 12, which advances mail 10 along shelf 66.

After mail 10 has been captured between front and rear tines 71, 72, stacker 61 then advances towards ACT 12 until front lines 71 mesh with rear tines 77 of stacker 62. Lead stacker 62 is raised in order to disengage front and rear tines 76, 77 from mail stack 100, and then moves to the right, past trailing stacker 61, to unload mail 10 from the next shuttle 8. Advantageously, stackers 61, 62 continuously move in this 'leap frog' fashion, unloading mail 10 from shuttles 8 to form mail stack 100.

Backstop 64 is mounted to front support rail 68, and can be raised, lowered and translated in a manner similar to stackers 61, 62. Backstop 64 includes fixed support post 13 with tines 14, which support the front end, or left-most edge, of mail stack 100, generally, as it is created by stackers 61, 62. While mail stack 100 is being created by stackers 61, 62, backstop 64 abuts edge 15 of shelf 66 to support the front end of mail stack 100. During the creation of mail stack 100, separator 65 is positioned below shelf 66, while autopaddle 63 is positioned above shelf 66.

When mail stack 100 reaches a predetermined length, such as, for example, at least 12", trailing stacker 61 and backstop 64 move toward ACT 12, along rear support rail 67 and front support rail 68, respectively, in unison, to advance the left-most portion of mail stack 100 over ledge 15 and into ACT 12. Separator 65 then extends up through gap 16 and into mail stack 100, thereby separating the left-most portion of mail stack 100 into an ACT-sized mail portion 110. In a preferred embodiment, ACT-sized mail portion 110 is about 12" long.

Autopaddle 63 is mounted to rear support rail 67 and can be raised, lowered and translated in a manner similar to stackers 61, 62 and backstop 64. Autopaddle 63 includes tines 17, as well as a mechanism to remove, and re-attach, the front panel, or door, of ACT 12. After mail portion 110 has been separated from mail stack 100, autopaddle 63 descends and tines 17 cooperatively mesh with fingers 18 of separator 65. In cooperation with backstop 64, autopaddle 63 then moves towards ACT 12 in order to push mail portion 110 completely into ACT 12. Separator 65 is then lowered below extendable shelf 66, autopaddle 63 re-attaches the door on ACT 12. Backstop 64 then moves up and out of ACT 12, which is transported away on conveyor 71, to be replaced by an empty ACT 12 via conveyor 71. Autopaddle 63 removes the door on the new ACT 12 and then moves up and away from ACT 12. Backstop 64 then descends to support the front end of mail stack 100. The process of loading ACT 12 repeats when mail stack 100 reaches the predetermined length once more.

Figure 12B:
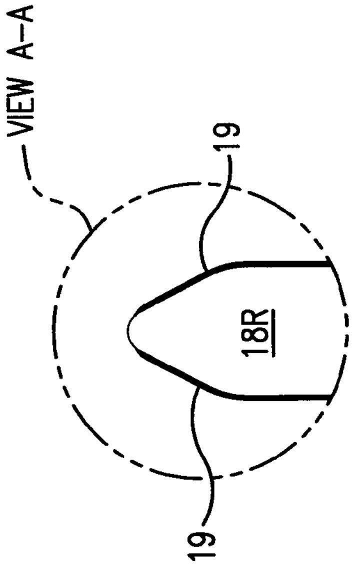
FIG. 12B depicts a sectional view A-A therethrough, in accordance with an embodiment of the present invention.
Figure 12A:
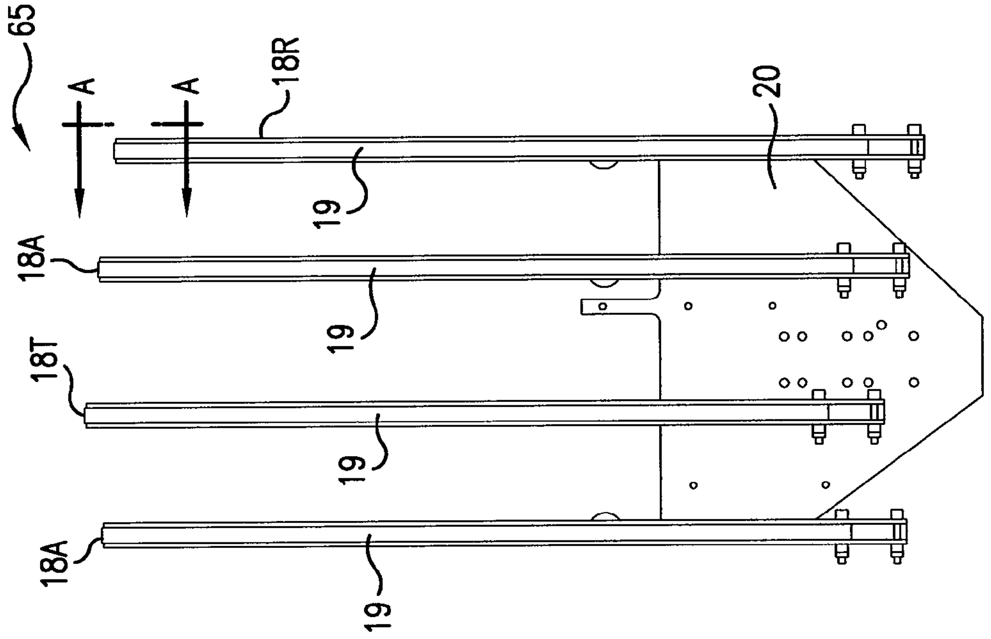
FIG. 12A depicts a two dimensional view of a separator for an automated flats divider.

FIG. 12A depicts a two dimensional view of a separator for an automated flats divider, and FIG. 12B depicts a sectional view A-A therethrough, in accordance with an embodiment of the present invention. Separator 65 includes several fingers 18, and, in a preferred embodiment, four fingers 18 are attached to plate 20. Two belts 19, mounted on rollers, form opposing sides of each finger 18. Belts 19 present non-moving surfaces to mail stack 100 as separator 65 extends vertically into mail stack 100 to separate and create mail portion 110. A piece of mail that contacts the top of finger 18 is advantageously driven to either side of finger 18, which prevents finger 18 from pushing that piece of mail out of mail stack 100. Additionally, fingers 18 are aligned in the horizontal direction and staggered in the vertical direction, which significantly reduces the tendency of a piece of mail to become interleaved between two different fingers 18. For example, in the embodiment depicted in FIG. 12, finger 18T is mounted on plate 20 at a higher location than the other fingers 18, and will, therefore, enter mail stack 100 first. The two fingers 18A, adjacent to finger 18T, then enter the center of the gap created by finger 18T simultaneously, followed by the remaining finger 18R. To enhance the performance of separator 65, kick out mechanism 93 and cam set 94 may also be provided.

Figure 13:
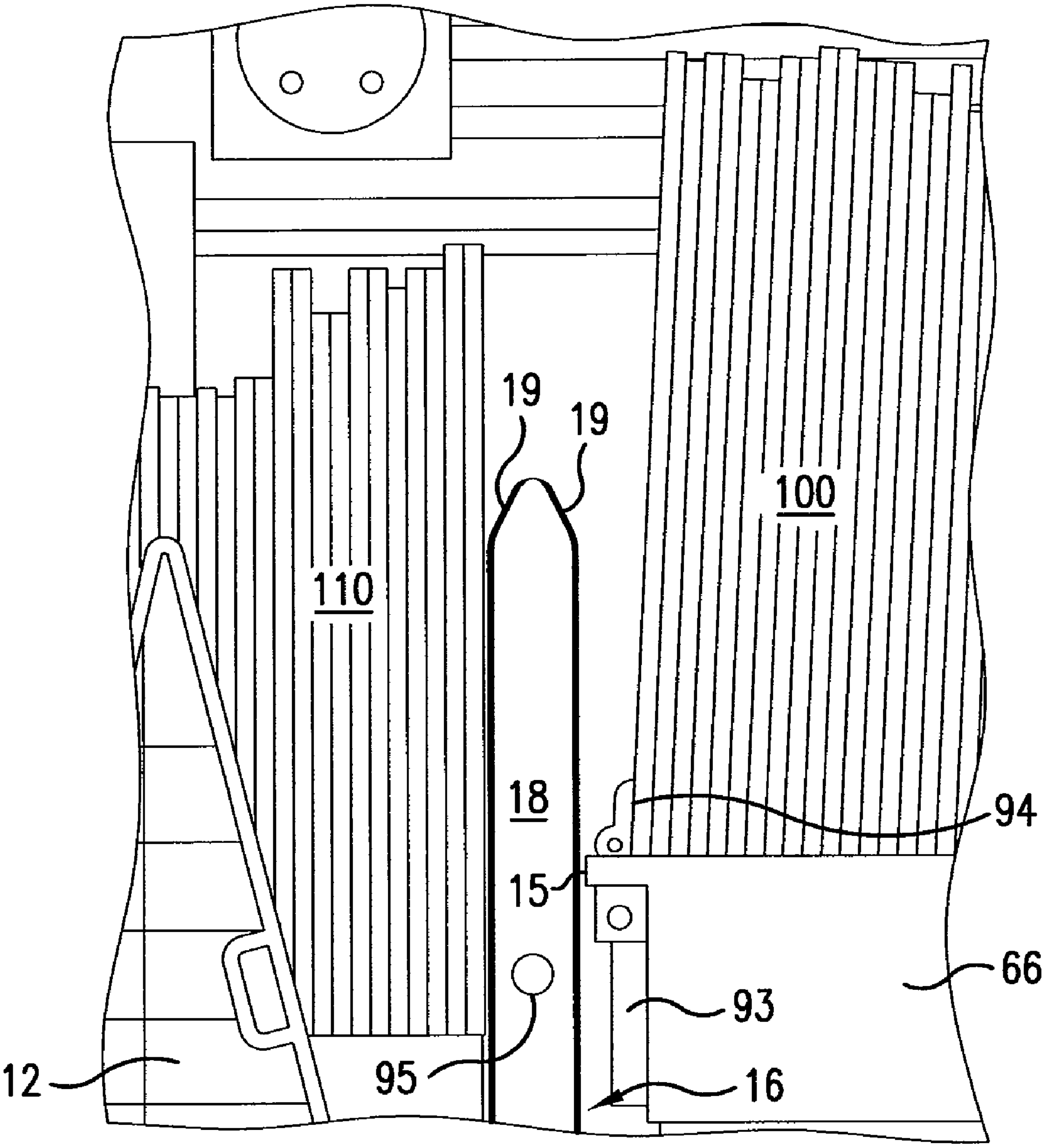
FIG. 13 depicts a two dimensional view of a portion of a stacker/loader for an automated flats divider, in accordance with an embodiment of the present invention.

FIG. 13 depicts a two dimensional view of a portion of a stacker/loader for an automated flats divider, in accordance with an embodiment of the present invention. As the left-most portion of mail stack 100 advances over ledge 15, the individual pieces of mail may begin to slide down into gap 16, i.e., fall off ledge 15, as gravity overcomes the inter-stack pressure created by backstop 64 and trailing stacker 61. Before separator 65 is extended into mail stack 100, kick out mechanism 93 may extend from shelf 66 to engage, and push, that portion of mail stack 100 that has slipped down into gap 16 to create a gap along the bottom edge of mail stack 100 directly above separator 65. Additionally, as kick out mechanism 93 begins to create this gap along the bottom edge of mail stack 100, cam set 94 rotates, and engages, the leading edge of mail stack 100, remaining on ledge 15, to prevent additional pieces of mail from falling into gap 16. Separator 65 then extends up through the gap created along the bottom edge of mail stack 100, to cut mail stack 100 and create ACT-sized mail portion 110. Kick out mechanism 93 is then retracted (as depicted in FIG. 13). Cam set 94 is retracted after backstop 64 is moved back to its position near ledge 15, as discussed above.

Notwithstanding the actions of kick out mechanism 93, cam set 94 and separator 65, if a piece of mail becomes interleaved between two fingers 18, a photo-electric sensor 95 may be mounted on exterior finger 18R to detect this interleaved piece of mail. In this embodiment, photo-electric sensor 95 sends a beam of light through corresponding holes in interior fingers 18A, 18T, which is reflected by a reflector mounted on exterior finger 18A. Photo-electric sensor 95 reads the reflected light to determine whether the beam has been blocked by an interleaved piece of mail. If so, separator 65 may be lowered, kick out mechanism 93 and cam set 94 may be retracted, and the separation process may be repeated to create a new separation point within mail stack 100.

In a preferred embodiment, stackers 61, 62, autopaddle 63, backstop 64, and separator 65, as well as shuttle tilter 4, kick out mechanism 94 and cam set 95, are controlled by one or more microprocessors, microcontrollers, etc., using various actuators and sensors, such as, for example, motors, pistons, optical detectors, inductive sensors, etc., to unload mail 10 from shuttle 8, create mail stack 100 and load ACT 12 with a portion of mail stack 100.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

We claim:

1. An automated flats handling system, comprising:

a plurality of shuttles;

a tray unloading section, including a first shuttle conveyor, to unload mail from a standard tray into one of the shuttles;

a quality control area, including a second shuttle conveyor coupled to the first shuttle conveyor, to facilitate grooming the mail in said one of the shuttles;

a shuttle tilter, coupled to the second shuttle conveyor, to tilt each shuttle prior to unloading the mail from said one of the shuttles;

a shuttle return section, including a third shuttle conveyor coupled to the shuttle tilter and the first shuttle conveyor, to return each of the shuttles to the tray unloading section; and a stacker/loader to cooperate with the shuttle tilter and unload the mail from the shuttles, to create a mail stack from the unloaded mail, and to load a portion of the mail stack into an automation compatible tray, wherein the stacker/loader includes:

a frame;

a shelf attached to the frame;

a slotted surface plate, attached to the shelf, to cooperate with a plurality of slots in each shuttle;

two stackers, coupled to the frame, to unload the mail from each shuttle and to create a mail stack from the unloaded mail;

a backstop, coupled to the frame, to support the front end of the mail stack;

a separator, coupled to the frame, to divide the mail stack into a smaller portion of mail; and an autopaddle, coupled to the frame, to load the smaller portion of mail into the automation compatible tray.

2. The automated flats handling system of claim 1, wherein each stacker includes a fixed set of tines and a movable set of tines, the backstop includes a set of tines and the autopaddle includes a set of tines.

3. The automated flats handling system of claim 2, wherein the two stackers, the backstop and the autopaddle translate along the frame in a direction parallel to the shelf.

4. The automated flats handling system of claim 3, wherein the two stackers, the backstop, the autopaddle and the separator translate in a direction perpendicular to the shelf.

5. The automated flats handling system of claim 3, wherein the set of movable tines translates along the stacker in the direction parallel to the shelf.

6. The automated flats handling system of claim 2, wherein the stacker/loader includes a conveyor to transport the automation compatible tray.

7. The automated flats handling system of claim 2, wherein the separator includes a plurality of staggered fingers, each having at least two belts located on opposing sides of the finger.

8. The automated flats handling system of claim 2, wherein the stacker/loader includes a kick out mechanism, coupled to the shelf, to create a gap in a bottom edge of the mail stack.

9. The automated flats handling system of claim 2, wherein the stacker/loader includes a set of cams to secure the front edge of the mail stack during the creation of the smaller portion of mail.

10. A stacker/loader for an automated flats handling system, comprising:

a frame;

a shelf attached to the frame;

a slotted surface plate, attached to the shelf, to cooperate with a plurality of slots in a mail shuttle;

two articulated stackers, each coupled to the frame and having a fixed set of tines and a movable set of tines, to unload mail from the mail shuttle and to create a mail stack from the unloaded mail;

an articulated backstop, coupled to the frame and having a fixed set of tines, to support the front end of the mail stack;

an articulated separator, coupled to the frame and having a plurality of fingers, to divide the mail stack into a smaller portion of mail; and an articulated autopaddle, coupled to the frame and having a fixed set of tines, to load the smaller portion of mail into an automation compatible tray;

a conveyor to deliver and remove automation compatible trays.

11. The stacker/loader of claim 10, wherein:

the two stackers, the backstop and the autopaddle translate along the frame in a direction parallel to the shelf;

the two stackers, the backstop, the autopaddle and the separator translate in a direction perpendicular to the shelf; and each set of movable stacker tines translates along the stacker in the direction parallel to the shelf.

12. The stacker/loader of claim 11, wherein:

the separator includes a plurality of staggered fingers, each having at least two belts located on opposing sides of the finger; and the stacker/loader includes:

a kick out mechanism, coupled to the shelf, to create a gap in a bottom edge of the mail stack, and a set of cams to secure the front edge of the mail stack during the creation of the smaller portion of mail.

* * * * *